Sept. 23, 1952 — F. M. WALLS — 2,611,448
OIL AND OIL FILTER CONDITION INDICATOR
Filed Aug. 27, 1949
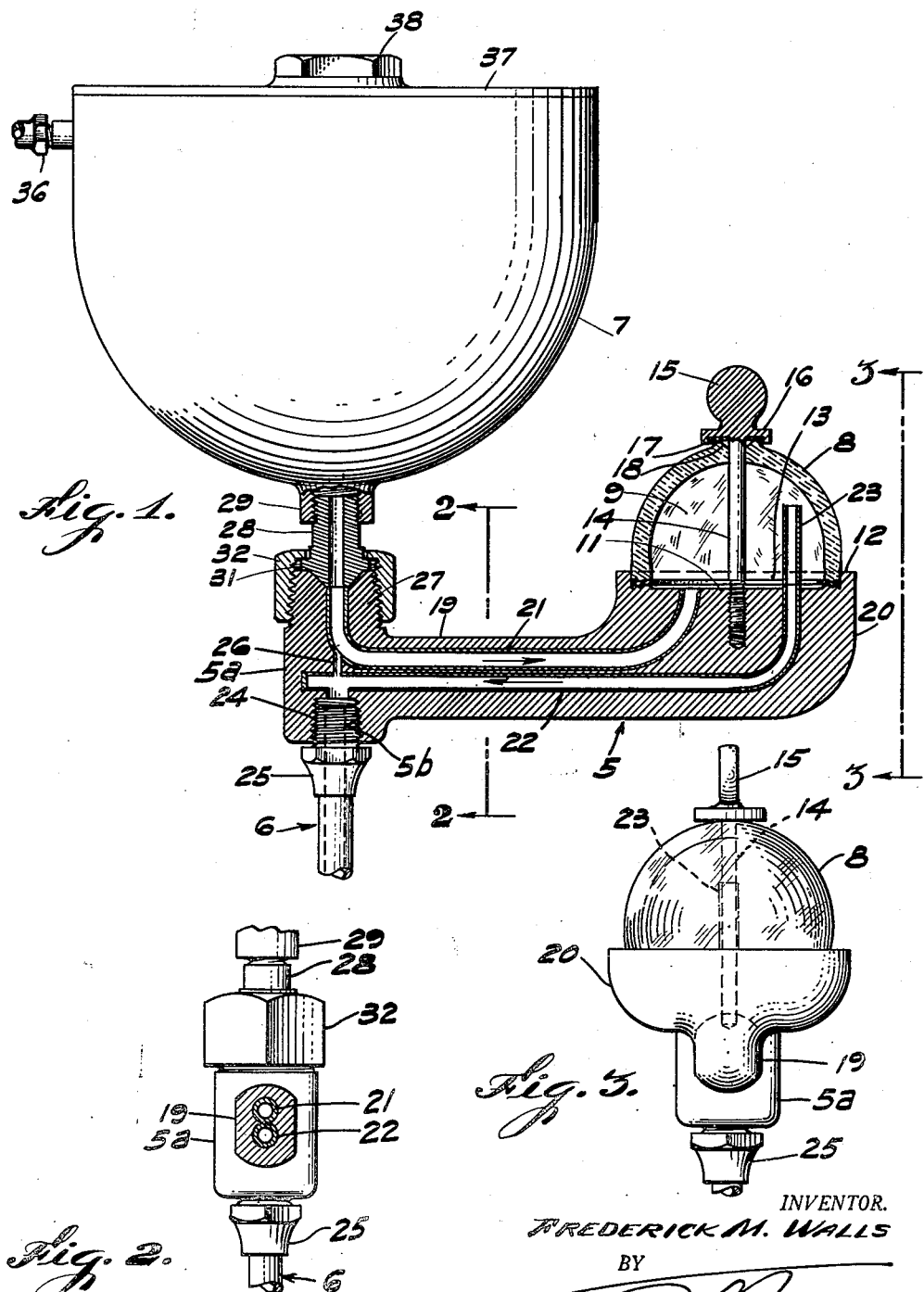
INVENTOR.
FREDERICK M. WALLS
BY
ATTORNEY Patented Sept. 23, 1952

2,611,448

UNITED STATES PATENT OFFICE 2,611,448

OIL AND OIL FILTER CONDITION INDICATOR

Frederick M. Walls, Sun Valley, Calif., assignor, by mesne assignments, to Roger T. Schmitz, Altadena, Calif.

Application August 27, 1949, Serial No. 112,709

3 Claims. (Cl. 184—6)

This invention relates to an oil and oil filter condition indicator.

More specifically speaking, the invention pertains to an attachment, applicable to self-propelled vehicles already on the market, said device indicating visually to the motorist, not only the quality of the oil flow but also the extent to which it is being clarified by the filter.

Hitherto it has been necessary for an oil station attendant to withdraw from the engine the "bayonet" or oil gage stick in order to obtain an indication of the condition of the oil in the oiling system, hence the need of providing a means for avoiding this undesirable procedure.

Also there is a need for an indicator that will disclose, not only the quality of the oil in the lubricating system, but will also indicate whether or not it is being properly filtered.

Accordingly one of the objects of this invention is to provide a conveniently observable means which will inform the motorist regarding not only the quality of oil in the system, but also as to whether or not it is being properly filtered.

Another object is to provide a device of the kind stated which will indicate plugging of the filter cartridge and a resulting cessation of the flow of the oil therethrough.

Other objects of the invention relate to the provision of an oil clarity indicating device of a simplified durable character, requiring a small amount of material for its construction and which can be manufactured at low cost by die casting.

Yet other objects relate to the provision of a device of the kind stated that can readily be inserted into motor vehicle oil circulatory systems in use.

The invention further relates to a device of the stated kind having an oil inspection chamber from which the oil automatically drains out in a short time after the engine is stopped, thus safeguarding against clogging in cold weather.

The invention pertains both to a new combination of oil circulation and oil indicating means, and to a new article of manufacture which comprises an oil by-passing member insertable into oil circulatory systems now on the market, said member having a transparent wall portion through which a portion of the oil being by-passed therethrough is visible to a motorist or service station attendant.

The oil inspection means afforded by this invention makes it possible to determine the condition of the oil in regard to its cleanliness more accurately than can be done by dipping an oil gage stick into the oil and then noting the appearance of the oil film collected thereon.

Other objects, advantages and features of invention will hereinafter appear.

Referring to the accompanying drawing, which illustrates a preferred embodiment of the invention, Fig. 1 is a longitudinal midsection of the attachment, this view including, in elevation, adjacent parts of the oil filtering and circulatory system.

Fig. 2 is a cross section on line 2—2 of Fig. 1, the body portion of the filter being broken away to contract the view.

Fig. 3 is an end elevation of the device looking thereat from the plane indicated by line 3—3 in Fig. 1.

Referring in detail to the drawing, the invention is therein shown embodied in an elongated, horizontally extending oil by-passing member 5, one end portion of which is shown having a vertically extending cylindrical enlargement 5a inserted in a conventional oil line 6 subjacent to a filter 7, the part of said oil line shown below said member 5 returning the oil to a crank case. The opposite end portion of said elongated member has secured to it a glass dome 8 within which is an oil chamber 9 which fills with oil when the engine starts and remains so filled while the engine is running.

As shown in Fig. 1 said elongated member 5 extends horizontally from the oil line 6, the outer end portion of said member having a flat upper face 11 surrounded by an upstanding circular rib 12, the dome fitting snugly within said rib, there being a gasket 13 under the dome against which the dome is firmly held by a screwthreaded pin 14 which passes centrally through said dome and is screwed into the central portion of said circular face 11. Said pin is shown having a flattened head 15 which is manually graspable to screw down the pin, and this head has an expanded circular base portion 16 under which is a gasket 17 to prevent leakage through the upper part of the dome. A frusto-conical recess 18 around the mouth of the aperture through the dome presents a sharp circular edge to the lower face of the gasket and aids in providing a fluid tight structure at this point.

The aforesaid elongated, dome supporting member 5 may be varied in structural details without departing from the scope of the claimed invention. It is shown having a horizontal neck portion 19 which carries at its outer end a head 20 that is formed by upwardly and laterally expanding it, as aforesaid. Said head 20 supports the dome 8 at a slightly lower level than that of the filter 7.

In order to by-pass the oil from the line 6 through the inspection chamber 9 the elongated member 5 is provided internally with two longitudinally extending conduits 21 and 22. These two conduits may consist of copper tubing shaped and positioned as shown and subsequently invested with the cast metal of which the body portion of the member 5 is made. Each of these conduits communicates with the oil inspection chamber 9, the conduit 22 having a straight, upstanding outer end portion 23 which terminates in the upper portion of said chamber 9, and the upper end of the conduit 23 is at a lower level than all portions of the oil in the filter.

The inner end of the neck 19 of the elongated member 5 joins the aforesaid cylindrical enlargement 5a a little above the lower end of the latter where there is a screwthreaded bore 5b into which is screwed the threaded upper end portion 24 of a conventional fitting 25 to attach the pipe to cylindrical part 5a of the device. A short, diametrically restricted bleed passage 26 affords communication between said bore and the adjacent end portion of the aforesaid upper conduit 21, the internal diameter of each of said conduits 21 and 22 being much greater than the diameter of said passage 26. Owing to said passage 26 being in axial alinement with said bore 5b, the former may readily be made by using a drill inserted through the latter.

Above the parts which have just been mentioned the member 5a has an upwardly directed, externally screwthreaded end portion 27 having a frusto-conical mouth shaped to abut in a fluid tight manner against the frusto-conical lower end of an adapter 28, the upper end portion of which screws into a tubular boss 29 on the lower end of the filter. Said adapter has an annular shoulder 31 around its lower end portion with which cooperates a coupling sleeve 32 that is screwed onto the aforesaid screwthreaded part 27.

The filter 7 is provided with an inlet fitting 36 and with a screwed-on cover 37 furnished centrally with a nut 38 to which to apply a wrench. It is to be understood that a conventional cartridge of filtering material is contained within the filter to be replaced by a new one when the need thereof is indicated.

Preparatory to putting the device into its operative position the oil is drained out of the filter 7 and the threaded part 24 of the fitting 25 is unscrewed from the boss 29 of the filter 7. Then the adapter 28, with the coupling sleeve 32 in a surrounding relation thereto, is screwed into said boss. Thereupon the coupling sleeve 32 is screwed onto the screwthreaded part 27 and the threaded portion 24 of the said fitting is screwed into the bore 5b of the cylindrical part 5a, and the device is ready for use.

If the dome 8 remains empty after the engine has started running, a plugged filter cartridge is indicated, and if the oil within said dome has a cloudy appearance it indicates that the filtering material has become overloaded with impurities. But when clean oil is seen to be flowing through the chamber 9 within the dome 8 the motorist is assured that the lubricating system is operating well.

The dome 8 remains full of oil for a short time after the motor is stopped, but drains out in about five minutes through the bleed passage 26, said passage being so small a diameter as not to interfere materially with the by-passing of the oil through the inspection chamber 9.

Owing to the outer end portion 23 of the conduit 22 terminating in the upper part of the inspection chamber 9 the oil cannot drain out from the lower part of the chamber 9 through said pipe 22, and therefore it must gradually drain out through the passage 21 and constricted bleed passage 26, about five minutes being required for this to take place.

If, after the oil is bled out from the inspection chamber 9 through the upper passage 21 and the bleed passage 26 and the engine again started, no oil reappears in said inspection chamber, a clogged condition, presumably in the filter, is indicated.

On the other hand, if the motorist drives into the service station and the attendant sees no oil in the inspection chamber, he also knows immediately that the filter cartridge is plugged up and needs to be replaced with a new one.

I claim:

1. An oil flow and condition indicating means for the oil circulatory conduit system of an automotive engine equipped with a crank case and an oil filter through which the oil flows from the crank case and back again comprising a horizontally extending elongated member having an inner end portion secured in said oil circulatory conduit system between said filter and crank case and an enclosed oil chamber carried by the opposite end portion of said elongated member, said chamber having a transparent wall portion through which the oil therein is observable, said elongated member having within it an upper longitudinally extending conduit into which all the oil flow through said circulatory system is conducted, said conduit leading to the lower part of said chamber, and a lower longitudinal conduit within said elongated member, the latter conduit communicating with the upper portion of said chamber and conducting the oil therefrom back to said oil circulatory system, there being a bleed passage which connects said longitudinal conduits with each other to drain the oil out of said chamber after said engine has stopped running, each of said longitudinal conduits having an oil flow capacity much greater than that of said bleed passage.

2. An oil flow and condition indicating means for the oil circulatory conduit system of an automotive engine equipped with a crank case and an oil filter through which the oil from and to the crank case passes comprising a horizontally extending elongated member having an inner end portion secured in the oil line of said oil circulatory system between said filter and crank case, an oil inspection chamber carried by the opposite end portion of said member, oil by-passing means carried by said member which by-passes the oil circulating in said line through said inspection chamber, said by-passing means comprising an upper and a lower conduit extending longitudinally of said elongated member, said lower conduit terminating in the upper part of said inspection chamber and said upper conduit leading from the bottom thereof, said conduits consisting of tubes embedded in said elongated member and having adjacent inner end portions, there being a bore communicating with said oil line and leading right-angularly up through said elongated member into said inner end portion of said lower conduit, and a bleed passage of a greatly restricted diameter in relation to the diameters of said bore and said oil by-passing means, said bleed passage placing said inner end portions of said lower and upper conduits into communication with each other.

3. As an article of manufacture, a horizontal elongated member having one of its end portions securable in one side of an oil circulatory conduit system of an automotive engine in such a position that the oil conduit at that side of said system extends transversely of the length of said member, an enclosed oil container carried by the opposite end portion of said elongated member, said container having a transparent wall portion through which the oil therein is observable, said elongated member having within it a pair of vertically spaced passages which by-pass the oil of the circulatory system through said enclosed oil container, said pair of passages comprising an upper longitudinally extending conduit into which all the oil flowing through said circulatory system is conducted, said conduit leading to the lower part of said container, and a lower longitudinal conduit within said elongated member, the latter conduit communicating with the upper portion of said container and conducting the oil therefrom back to said oil circulatory system, there being a bleed passage connecting the passages of said pair and causing the oil to drain out of said enclosed oil container when the engine stops running.

FREDERICK M. WALLS.

REFERENCES CITED

The following references are of record in the file of this patent:

UNITED STATES PATENTS

| Number | Name | Date |
|---|---|---|
| 1,157,390 | Hewitt | Oct. 19, 1915 |
| 1,451,646 | Bittler | Apr. 10, 1923 |
| 1,589,997 | Spaeth | June 22, 1926 |
| 2,122,642 | Gerdt | July 5, 1938 |
| 2,294,330 | Clark | Aug. 25, 1942 |

FOREIGN PATENTS

| Number | Country | Date |
|---|---|---|
| 25,756 | Great Britain | of 1906 |